US005648970A

United States Patent [19]
Kapoor

[11] Patent Number: 5,648,970
[45] Date of Patent: Jul. 15, 1997

[54] METHOD AND SYSTEM FOR ORDERING OUT-OF-SEQUENCE PACKETS

[75] Inventor: Vijay Kapoor, Phoenix, Ariz.

[73] Assignee: Motorola, Inc., Schaumburg, Ill.

[21] Appl. No.: 606,471

[22] Filed: Mar. 4, 1996

[51] Int. Cl.$^6$ .................................................. H04L 12/56
[52] U.S. Cl. ........................................ 370/394; 370/902
[58] Field of Search ...................... 370/60, 60.1, 94.1, 370/94.2, 94.3, 100.1, 105.1, 61; 375/372, 356; 340/825.01, 825.03, 825.02

[56] References Cited

U.S. PATENT DOCUMENTS

| 5,278,828 | 1/1994 | Chao | 370/85.6 |
|---|---|---|---|
| 5,400,324 | 3/1995 | Eriksson et al. | 370/60 |

*Primary Examiner*—Dang Ton
*Attorney, Agent, or Firm*—Kevin K. Johanson; Sherry J. Whitney

[57] ABSTRACT

In a packet switched network, a method and system order packets arriving out-of-sequence from a lower service. An ordering service temporarily buffers packets (101–115) while delayed packets arrive and forwards in-sequence packets to an upper service. Delay introduced by buffering does not accumulate as a propagation toleration timer (304) is activated for a predetermined time period (120) while awaiting the arrival of delayed packets or until the delayed packet arrives. Out-of-sequence packets are grouped between a lower-bound and an upper-bound of sequence identifiers to avoid accumulated delay due to repetitive lost packets.

17 Claims, 2 Drawing Sheets

METHOD AND SYSTEM FOR ORDERING OUT-OF-SEQUENCE PACKETS

FIELD OF THE INVENTION

This invention relates generally to digital communications and, more particularly, to packetized data transfers through multi-path communication networks.

BACKGROUND OF THE INVENTION

Traditional packetized networks have generated packets of data and injected them into networks having a connection-oriented topology wherein packets propagated serially from a source to a destination and therefore arrived in sequence for re-assembly into information strings. As network topologies evolve and interconnect paths become more complex, propagation paths become more varied. Information from a source may be packetized and routed to a destination over divergent paths. A destination may receive packetized information out-of-sequence.

Traditionally, out-of-sequence packets were serviced by accepting only those packets received in order and requesting a re-transmission of those packets received out-of-sequence. Additionally, re-transmission requests may have occurred prematurely as sequential packets may have propagated through paths having different delays. Often times, a request for re-transmission may cause a link to reset and perform overhead functions. Furthermore, some packets may be lost or destroyed in the network and never arrive at the destination.

To accommodate propagation duration variations, timers have been employed to provide a delay equal to the longest propagation paths. Complications involving timers arise, however, when multiple packets are lost in the system. Activating an individual delay timer for each delayed or missed packet becomes a complex and inefficient task when a series of packets are missing. Management of multiple timers robs processors and controllers of resources for servicing data and therefore impacts system performance.

If a single delay timer is employed and reused for each subsequently missing or delayed packet, then other inefficiencies are introduced. When an initial packet is delayed and a system activates a timer for the maximum propagation delay period, the timer will expire following the delay period. If during the delay period, multiple packets had been detected as being delayed, then the timer would be restarted for a subsequently missed packet. In this scenario, however, the timer is not activated at the point in time when the subsequent packet was detected as being delay, but rather the timer is activated at a point in time when the timer expired from detecting the previously delayed packet. In such a scenario, delay has accumulated because the delay timer is being started only after it has expired for a previously delayed packet. When delay time, due to the sequential operation of the delay timer, accumulates to a point intolerable by an upper network service, that upper service will time-out and reset the link, thus exacerbating the situation.

Thus, what is needed is a system and method for ordering received packets arriving out-of-sequence from a lower service and forwarding the packets to an upper service in-sequence without accumulating delay introduced by late or dropped packets.

Also, what is needed is a system and method for ordering received packets arriving out-of-sequence by employing a single, system-manageable propagation toleration timer.

BRIEF DESCRIPTION OF THE DRAWINGS

The invention is pointed out with particularity in the appended claims. However, a more complete understanding of the present invention may be derived by referring to the detailed description and claims when considered in connection with the figures.

Figure 1:
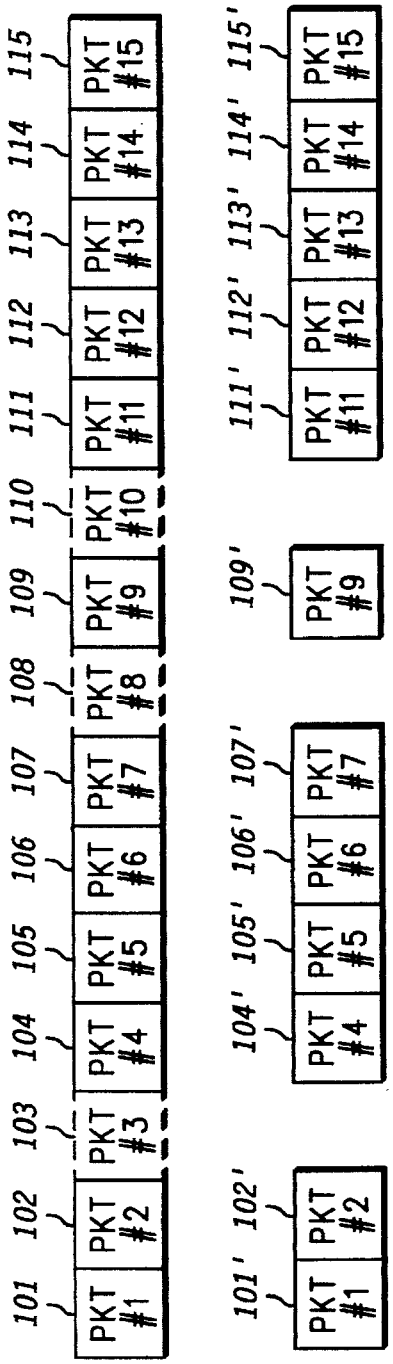
FIG. 1 is a diagram showing successive packets as propagated through a packet switched network, in accordance with an embodiment of the present invention.
Figure 1:
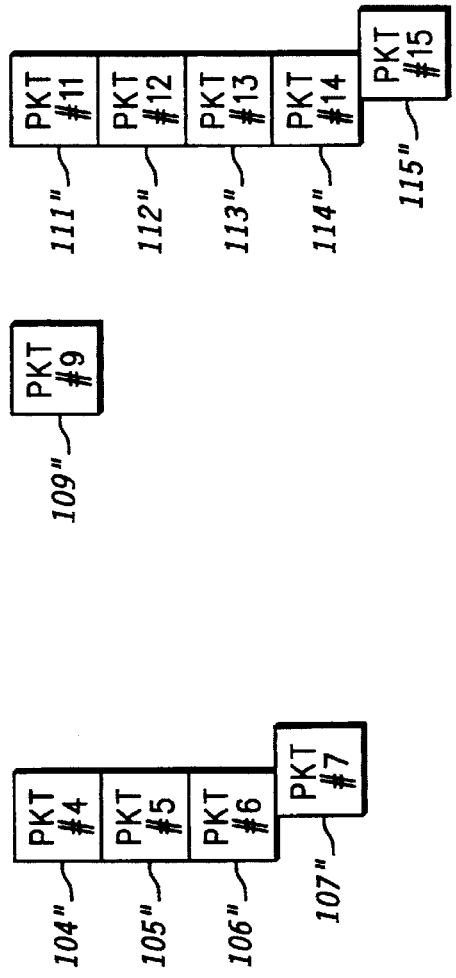
Figure 1:
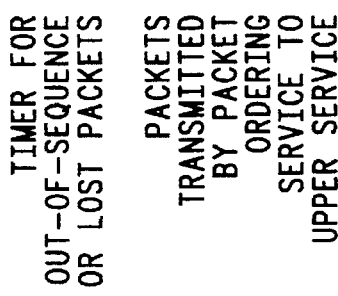

The exemplification set out herein illustrates a preferred embodiment of the invention in one form thereof, and such exemplification is not intended to be construed as limiting in any manner.

DETAILED DESCRIPTION OF THE DRAWING

The present invention provides, among other things, a method and system for ordering received packets arriving out-of-sequence from a lower service and forwarding the received packets to an upper service without accumulating delay introduced by late or dropped packets.

FIG. 1 is a diagram showing successive packets as propagated through a packet switched network, in accordance with an embodiment of the present invention.

Information in a packet switched network is partitioned or packetized at a source for transmission through varying propagation paths such as lower services like physical or link layers. These packets are shown as received packets 101–115. In an ideal network, all packets 101–115 arrive at a destination and ideally in sequence for re-assembly into information blocks or strings. However, often networks drop or delay packets due to interference or congestion. Packet 103, packet 108, and packet 110 are shown as lost packets that do not arrive at a destination in a network.

Figure 3:
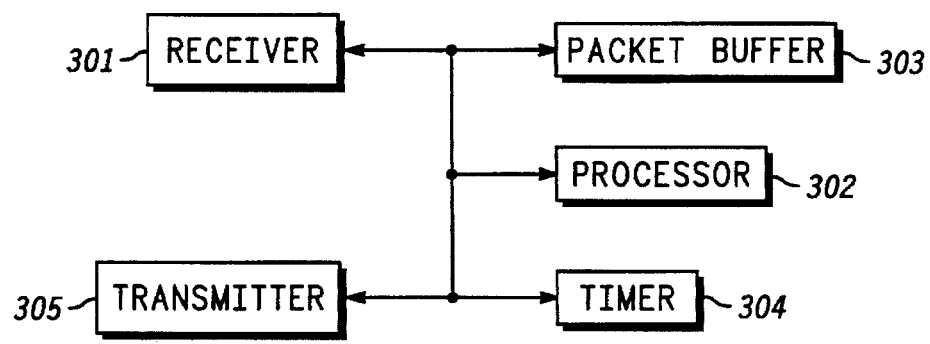
FIG. 3 is a block diagram of a system or service for ordering packets arriving out-of-sequence and awaiting the arrival of delayed packets, in accordance with an embodiment of the preferred invention.

An ordering service or service in a packet switch network stores packets 101', 102', 104'–107', 109', and 111'–115' in a packet buffer for processing. Note that missing packets 103, 108, and 110 do not arrive intact at the ordering service and therefore are not buffered. When packets are received in sequence, no special processing is required and such packets are only transiently stored in a packet buffer 303 (FIG. 3). The ordering service or layer forwards packets 101" and 102" to an upper service for additional processing.

An ordering service does not immediately recognize when a packet, such as packet 103, is missing. Only when a subsequent packet, such as packet 104 arrives, does the service recognize the existence of a lost or delayed packet. An ordering service maintains a record denoting an expected sequence identifier corresponding to the sequence identifier of the most previously forwarded packet incremented by one unit. When an out-of-sequence packet, such as packet 104, is completely received, it is collated in packet buffer 303 (FIG. 3) according to its sequence identifier. Each of packets 101–115 transmitted through the packet switched network contains a sequence identifier denoting an order or sequence essential to synthesizing the packets back into an information string.

Packet buffer 303 (FIG. 3) administers a queue by maintaining a lower-bound defining a position of one of the received packets having an earliest or incrementally lesser sequence number and yet to be forwarded to an upper service. When an ordering service determines that the sequence identifier of the new packet, meaning the most recently received packet, does not correspond with an expected sequence identifier, the ordering service activates a propagation toleration timer 304 (FIG. 3) for a duration of a time period 120.

The ordering service denotes an upper-bound, corresponding to the sequence identifier of the out-of-sequence packet, such as packet 104', and begins timing for a duration sufficient to allow a previous packet, such as packet 103, to propagate through a worst case path in the packet switched network. Meanwhile, the ordering service continues to receive subsequent packets 104–106 and collates them in packet buffer 303 (FIG. 3).

When time period 120 expires, the ordering service determines that packet 103 was actually lost and suspends any further delay. The ordering service references the lower-bound denoting the earliest sequenced packet in packet buffer 303 (FIG. 3) and removes any packets having an earlier sequence identifier up through and including the upper-bound, packet 104'. Additional in-sequence packets such as packets 105' and 106' are also removed from the packet buffer for forwarding. The ordering service then forwards packets 104"–106" to an upper service for processing. If packet 103 arrives prior to the expiration of time period 120, then propagation toleration timer 304 (FIG. 3) is deactivated and packet 103 precedes packets 104"–106" and all are forwarded to the upper service.

When the ordering service completely receives packet 107, the ordering service then forwards packet 107' to the upper service as packet 107". FIG. 1 shows a packet 108 as also being lost in the packet switched network. Again, the ordering service detects this packet loss upon the arrival of a subsequent packet, such as packet 109, bearing a sequence identifier different from the expected sequence identifier. The ordering service defines an upper-bound in packet buffer 303 (FIG. 3) corresponding to the out-of-sequence packet 109 and activates propagation toleration timer 304 (FIG. 3) for a time period 121. If packet 108 arrives prior to the expiration of propagation toleration timer 304, then packet 108, bearing a sequence identifier corresponding with the expected sequence identifier, will be forwarded to an upper service. In FIG. 1, packet 108 is not received and propagation toleration timer 304 (FIG. 3) expires and triggers the removal and forwarding of all packets in packet buffer 303 bearing sequence identifiers earlier or equal to the upper-bound, packet 109.

Although the ordering service received and stored packet 111' in packet buffer 303 prior to the expiration of propagation toleration timer 304, the absence of packet 110 triggers an out-of-sequence process for missing packet 110 with packet 111 alerting the ordering service of the delayed or missing packet 110. The ordering service re-activates propagation toleration timer 304 (FIG. 3) for time period 122 to accommodate for the potential delayed arrival of packet 110 at the ordering service.

Upon the completion of time period 122, the ordering service removes from packet buffer 303 (FIG. 3) all packets bearing sequence identifiers earlier than or equivalent to the upper-bound (i.e., packet 111") and forwards them to the upper service. The ordering service then continues in-sequence removal and forwarding of sequential packets (i.e., packet 1121"–114") stored in packet buffer 303 (FIG. 3) and a subsequently received sequential in-order packet 115". It should be pointed out that any delay introduced by waiting for late or delayed packets does not accumulate. The reason is that the ordering service defines an upper-bound corresponding to the latest or largest sequence identifier of a receive packet. By grouping a set of packets and timing them together, accumulated delay is not introduced.

Figure 2:
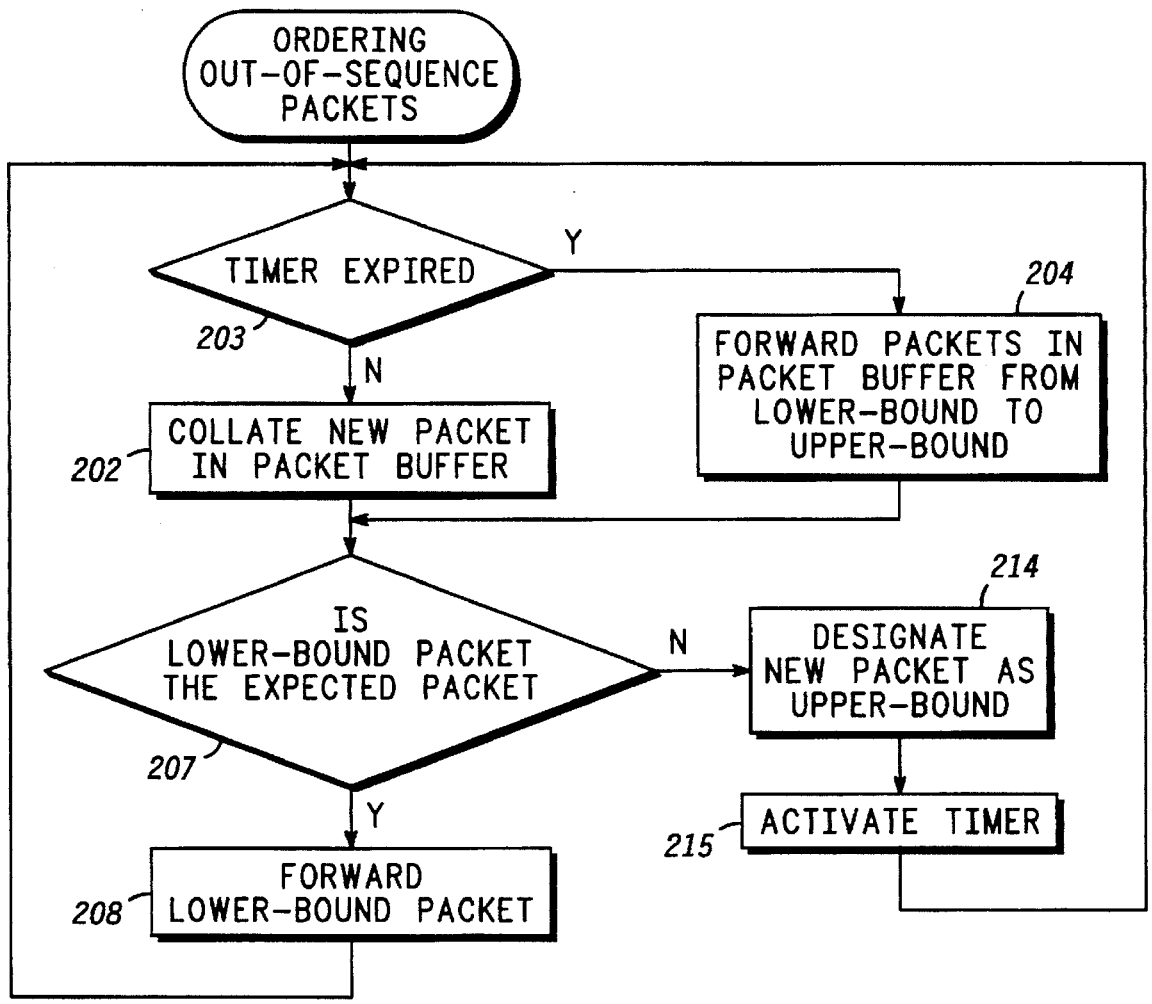
FIG. 2 is a flowchart of a method for ordering packets arriving out-of-sequence and awaiting the arrival of delayed packets, in accordance with an embodiment of the preferred invention.

FIG. 2 is a flowchart of a method for ordering packets arriving out-of-sequence and awaiting the arrival of delayed packets, in accordance with an embodiment of the preferred invention.

An information originator in a packet switched network packetizes information into a plurality of packets. Each of these packets is assigned a sequence identifier for use in re-assembling the packets into information strings at a destination. In the present invention, packets may be received from a lower service or from a communicating source and packets propagate across a plurality of varying paths that may introduce differing transmission times that cause packets to arrive out-of-sequence. The present invention orders packets having varying delays without accumulating delay introduced by late or dropped packets.

A query task 203 evaluates propagation toleration timer 304 (FIG. 3) for expiration of time periods 120–122 (FIG. 1). Time period 120 is sufficiently long in duration to exceed a maximum propagation duration of a packet through a maximum delay path in a packet switched network. Propagation toleration timer 304 may or may not be activated during this task. If packets are received in-sequence, then propagation toleration timer 304 is not activated and query task 203 detects a non-expired status.

When propagation toleration timer 304 is not expired or not activated, then a task 202 collates a new packet if one is received from a lower service. Collating may involve monitoring for an arrival of a new packet from a lower service and placing the new packet in packet buffer 303 (FIG. 3). The ordering service evaluates the sequence identifier of the new packet to determine where to insert the new packet in packet buffer 303. Packet buffer 303 maintains a lower-bound defining a position of a packet yet to be forwarded to an upper service and having an earliest sequence identifier of the packets in packet buffer 303. If the new packet bears a sequence identifier earlier than the present lower-bound identifier, then the new packet assumes the position of the lower-bound ahead of the previous lower-bound entry. If the new packet has a sequence identifier later than the lower-bound, then the new packet is inserted into packet buffer 303 in its proper relational sequence.

A query task 207 evaluates the lower-bound identifier against an expected sequence identifier. The expected sequence identifier corresponds to the next sequence identifier following the previously forwarded packet.

When the lower-bound identifier or the earliest sequence identifier corresponds with the expected sequence identifier, a task 208 forwards the packet in the lower-bound position to an upper service. This forwarding task may comprise removing the packet corresponding with the expected sequence identifier from packet buffer 303. Removal from packet buffer 303 frees buffer locations for subsequent packets and is necessary for a wrap-around packet buffer implementation wherein sequence numbers repeat or wrap-around when a sequence identifier surpasses its maximum value. Following a removing from packet buffer step, the packet corresponding to the expected sequence identifier is delivered or transferred to an upper service. The ordering service increments the expected sequence identifier and advances the lower-bound identifier in preparation for a subsequent comparison. When packet buffer 303 is empty, the propagation toleration timer is deactivated if it was activated.

A task 204 proceeds when propagation toleration timer 304 (FIG. 3) expires. The ordering service forwards inclusively each of the packets from the lower-bound to the upper-bound of packet buffer 303 to an upper service. Task 204 removes inclusively each of the packets from the lower-bound to the upper-bound to free up storage space. Each of these packets is then delivered or transferred to an upper service and the expected sequence identifier increments to one subsequent value past the upper-bound.

When the lower-bound does not correspond with the expected sequence identifier, a task 214 designates a position of the new packet in packet buffer 303 as the upper-bound identifier. The upper-bound identifier serves the purpose of grouping into a single entity all packets having a sequence identifier equal to or less than the upper-bound sequence identifier.

A task 215 activates propagation toleration timer 304 (FIG. 3) for a duration defined by time period 120 (FIG. 1). Processing then returns to task 203 to query for expiration of propagation toleration timer 304.

FIG. 3 is a block diagram of a system or service for ordering packets arriving out-of-sequence and awaiting the arrival of delayed packets, in accordance with an embodiment of the preferred invention. In a packet switched network, a system communicates information from a source to a destination across a plurality of varying propagation paths wherein the information may be received out-of-sequence and require re-ordering to facilitate re-assembly.

A receiver 301 monitors for an arrival of a new packet from either a lower service or from a source entity on a communication network. Receiver 301 may be a data structure in a process service in a communication protocol stack.

A packet buffer 303 transiently stores or buffers at least one received packet from receiver 301. Packet buffer 303 may be implemented as a data structure in software or as a hardware memory structure. Packet buffer 303 may be implemented as a wrap-around buffer having a lower-bound defining a position of at least one received packet yet to be forwarded that has an earliest sequence identifier of at least one received packet. Packet buffer 303 also has an upper-bound defining a position of at least one received packet when an earliest sequence identifier does not correspond with an expected sequence identifier.

A processor 302, electrically coupled to receiver 301 and packet buffer 303, collates a new packet according to a sequence identifier contained in the new packet. Processor 302 may be a shared or dedicated controller for executing the herein described methods. Processor 302 stores the new packet in packet buffer 303 and forwards a received packet from packet buffer 303 at the lower-bound of packet buffer 303. Processor 302 also designates a position of a new packet in packet buffer 303 as an upper-bound of packet buffer 303 when the earliest sequence identifier does not correspond with an expected sequence identifier. Processor 302 administers incrementing and management of upper and lower bounds, expected sequence identifiers and other data management structures and pointers. Processor 302 also activates the propagation toleration timer, and forwards inclusively each received packet from the lower-bound to the upper-bound of packet buffer 303 when propagation toleration timer 304 expires.

A propagation toleration timer 304, electrically coupled to processor 302, gauges time period 120 (FIG. 1) and expires upon an arrival of a maximum propagation duration of a received packet in a packet switched network. Propagation toleration timer 304 may physically be a timer or counter implemented from a system clock or an integral timer in processor 302.

A transmitter 305 delivers a packet to an upper service. Transmitter 305 may be implemented as a data structure in a process service in a communication protocol stack.

Thus, a method and system for ordering at least one received packet arriving out-of-sequence from a lower service and forwarding the received packet to an upper service without accumulating delay introduced by late or dropped packets has been described. Also, a method and system employing a single, system-manageable propagation toleration timer has been described allowing efficient management of a delay interim for accommodating packets having a greater propagation duration.

The present invention overcomes the aforementioned specific problems and accomplishes the aforementioned advantages relative to prior art methods and mechanisms. The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. In a packet switched network, a method for ordering a plurality of packets arriving out-of-sequence from a lower service and forwarding said plurality of packets to an upper service without accumulating delay introduced by late or dropped packets, said method comprising the steps of:

when a propagation toleration timer having an expiration exceeding a maximum propagation duration of any of said plurality of packets in said packet switched network continues unexpired, collating a new packet received from said lower service in a packet buffer according to a sequence identifier contained in said new packet, said packet buffer having a lower-bound defining a position of one of said plurality of packets yet to be forwarded and having an earliest sequence identifier of said plurality of packets in said packet buffer;

while said earliest sequence identifier corresponds with an expected sequence identifier, forwarding one of said plurality of packets at said lower-bound of said packet buffer to said upper service;

when said earliest sequence identifier does not correspond with said expected sequence identifier, designating a position of said new packet in said packet buffer as an upper-bound of said packet buffer, and activating said propagation toleration timer; and when said propagation toleration timer expires, forwarding inclusively each of said plurality of packets from said lower-bound to said upper-bound of said packet buffer to said upper service.

2. A method as recited in claim 1, wherein said collating step further comprises the step of:

monitoring for an arrival of said new packet from said lower service.

3. A method as recited in claim 1, wherein said forwarding said one of said plurality of packets at said lower-bound comprises the steps of:

removing said one of said plurality of packets designated by said lower-bound from said packet buffer;

delivering said one of said plurality of packets to said upper service; and incrementing said expected sequence identifier.

4. A method as recited in claim 3 further comprises the step of:

when said packet buffer is empty, deactivating said propagation toleration timer if activated.

5. A method as recited in claim 1, wherein said forwarding inclusively each of said plurality of packets from said lower-bound to said upper-bound of said packet buffer comprises the steps of:

removing inclusively each of said plurality of packets designated by said lower-bound to said upper-bound from said packet buffer;

delivering said each of said plurality of packets to said upper service; and incrementing said expected sequence identifier past said upper-bound.

6. In a packet switched network, a method for communicating information from a source to a destination across a plurality of varying propagation paths wherein said information may be received out-of-sequence, said method ordering said information arriving out-of-sequence without accumulating delay introduced by late or dropped information comprising the steps of:

packetizing said information into a plurality of packets;

transmitting said plurality of packets;

receiving a new packet, said new packet being one of said plurality of packets;

collating said new packet received in a packet buffer according to a sequence identifier contained in said new packet, said packet buffer having a lower-bound defining a position of one of said plurality of packets yet to be forwarded and having an earliest sequence identifier of said plurality of packets in said packet buffer when a propagation toleration timer having an expiration exceeding a maximum propagation duration of any of said plurality of packets in said packet switched network continues unexpired;

forwarding in order said one of said plurality of packets at said lower-bound of said packet buffer while said earliest sequence identifier corresponds with an expected sequence identifier;

designating a position of said new packet in said packet buffer as an upper-bound of said packet buffer, and activating said propagation toleration timer when said earliest sequence identifier does not correspond with said expected sequence identifier; and forwarding in order inclusively each of said plurality of packets from said lower-bound to said upper-bound of said packet buffer when said propagation toleration timer expires.

7. A method as recited in claim 6, further comprising the step of:

monitoring for an arrival of said new packet.

8. A method as recited in claim 6, wherein said forwarding in order said one of said plurality of packets at said lower-bound comprises the steps of:

removing said one of said plurality of packets designated by said lower-bound from said packet buffer;

delivering said one of said plurality of packets; and incrementing said expected sequence identifier.

9. A method as recited in claim 6, wherein said forwarding inclusively each of said plurality of packets from said lower-bound to said upper-bound of said packet buffer comprises the steps of:

removing inclusively each of said plurality of packets designated by said lower-bound to said upper-bound from said packet buffer;

delivering said each of said plurality of packets; and incrementing said expected sequence identifier past said upper-bound.

10. In a packet switched network for delivering a plurality of packets from an lower service to an upper service, a service for ordering said plurality of packets arriving out-of-sequence from said lower service and forwarding said plurality of packets to said upper service without accumulating delay introduced by late or dropped packets, comprising:

a packet buffer having a lower-bound defining a position of one of said plurality of packets yet to be forwarded and having an earliest sequence identifier of said plurality of packets, and having an upper-bound defining a position of a new packet, said new packet being one of said plurality of packets when said earliest sequence identifier does not correspond with an expected sequence identifier;

a propagation toleration timer for expiring upon a maximum propagation duration of any of said plurality of packets in said packet switched network; and a processor for collating said new packet received from said lower service according to a sequence identifier contained in said new packet and for forwarding one of said plurality of packets at said lower-bound of said packet buffer to said upper service, for designating the position of said new packet in said packet buffer as said upper-bound of said packet buffer when said earliest sequence identifier does not correspond with said expected sequence identifier, for activating said propagation toleration timer, and for forwarding inclusively each of said plurality of packets from said lower-bound to said upper-bound of said packet buffer to said upper service when said propagation toleration timer expires.

11. A service as recited in claim 10, further comprising:

a receiver for monitoring for an arrival of said new packet from said lower service.

12. A service as recited in claim 10, further comprising:

a means for removing said one of said plurality of packets designated by said lower-bound from said packet buffer;

a transmitter for delivering said plurality of packets to said upper service; and a means for incrementing said expected sequence identifier.

13. A service as recited in claim 10, further comprising:

a means for removing inclusively each of said plurality of packets designated by said lower-bound to said upper-bound from said packet buffer;

a means for delivering said each of said plurality of packets to said upper service; and a means for incrementing said expected sequence identifier past said upper-bound.

14. In a packet switched network, a system for communicating information from a source to a destination across a plurality of varying propagation paths wherein said information may be received out-of-sequence, said system for ordering a plurality of packets arriving out-of-sequence without accumulating delay introduced by late or dropped information, comprising:

a packet buffer having a lower-bound defining a position of one of said plurality of packets yet to be forwarded and having an earliest sequence identifier of said plurality of packets, and having an upper-bound defining a position of a new packet, said new packet being one of said plurality of packets when said earliest sequence identifier does not correspond with an expected sequence identifier;

a propagation toleration timer for expiring upon a maximum propagation duration of any of said plurality of packets in said packet switched network; and a processor for collating said new packet according to a sequence identifier contained in said new packet and for forwarding said plurality of packets at said lower-bound of said packet buffer, for designating the position of said new packet in said packet buffer as said upper-bound of said packet buffer when said earliest sequence identifier does not correspond with said expected sequence identifier, for activating said propagation toleration timer, and for forwarding inclusively each of said plurality of packets from said lower-bound to said upper-bound of said packet buffer when said propagation toleration timer expires.

15. A system as recited in claim 14, further comprising:

a receiver for monitoring for an arrival of said new packet.

16. A system as recited in claim 14, further comprising:

a means for removing said plurality of packets designated by said lower-bound from said packet buffer;

a transmitter for delivering said plurality of packets; and a means for incrementing said expected sequence identifier.

17. A system as recited in claim 14, further comprising:

a means for removing inclusively each of said plurality of packets designated by said lower-bound to said upper-bound from said packet buffer;

a means for delivering said each of said plurality of packets; and a means for incrementing said expected sequence identifier past said upper-bound.

* * * * *